UNITED STATES PATENT OFFICE 2,208,190

BIS-(ANTHRAQUINONEACRIDONO)-PYRENES AND PROCESS OF MAKING THEM

Walter Kern, Sissach, Switzerland, assignor to the firm Society of Chemical Industry in Basle, Basel, Switzerland No Drawing. Application February 24, 1939, Serial No. 258,347. In Switzerland March 2, 1938

8 Claims. (Cl. 260—276)

This invention relates to the manufacture of condensation products containing nitrogen by causing a condensing agent useful in ring closing to form acridone rings to act on a product of the general formula

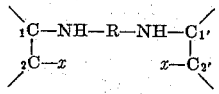

wherein the two pairs of carbon atoms $C_1C_2$ and $C_{1'}C_{2'}$ belong to anthraquinone nuclei $C_1$ and $C_{1'}$ being in $\alpha$-position and $C_2$ and $C_{2'}$ in $\beta$-position, R stands for a pyrene radical, connected with one imino group in 3-position and with the other imino groups in one of the positions 8 and 10 and wherein further each $x$ is a carboxyl group in which the hydroxyl may be replaced by a saponifiable residue, in some cases after treatment with a saponifying agent, and if required treating the product thus obtained with an agent having a substituting action or/and a further condensing action.

The products of the above general formula serving as parent materials for the invention can be made, for example, by reaction of 2 mols of negatively substituted anthraquinone carboxylic acids in which at least one negative substituent, for example a halogen, is in ortho-position to the carboxyl group, for example the 1-chloro- or 1-bromo-anthraquinone-2-carboxylic acid, with 1 mol of di-aminopyrenes; another procedure for making the parent materials is by analogous reaction of ortho-aminoanthraquinone carboxylic acids with negatively substituted pyrenes, for example di-chloro- and di-bromo-pyrenes. In the anthraquinone carboxylic acids used the hydroxyl of the carboxyl group may be replaced by a saponifiable residue, for example an O-alkyl residue, or halogen, or an amido group, in this case it is advantageous to treat the reaction product with a saponifying agent, for example alcoholic potash, before subjecting it to the action of the condensing agent. The reaction by which the products of the above formula are obtained are conducted in presence of a solvent or diluent, for example amyl alcohol, and advantageously in presence of a catalyst and an agent which binds acid.

The condensing agent which is caused to act on the reaction product of the above formula may for example be an acid condensing agent, such as a halide of an organic acid, sulfuric acid or a halogen-sulfonic acid. These condensing agents may be caused to act on the said reaction products at a raised temperature in the presence of a solvent or diluent. Halides of carboxylic acids, for example acetyl chloride or benzoyl chloride, are particularly suitable condensing agents.

The condensation products obtainable by the invention may be treated with agents having a substituting and/or a further condensing action whereby further valuable products are obtained. As such agents may be named for example: halogens and agents yielding halogen, sulfuric acid organic monocarboxylic acid halides, dicarboxylic anhydrides, amines such as aminoanthraquinones and amines of the benzene or naphthalene series, alkylating agents, caustic alkalies and aluminium halides, if required in presence of potassium chloride and sodium chloride.

The new products may be purified by recrystallisation once or more than once from solvents of high boiling point or by conversion into their salts with strong acids or by treatment with oxidizing agents, for example a solution of an alkali-hypochlorite. They may be converted according to known methods into their leuco derivatives, for example into leuco-sulfuric acid esters.

The products obtainable by the present invention represent pyrene-di-anthraquinone-diacridones and correspond to the general formula

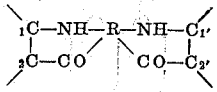

wherein the two pairs of carbon atoms $C_1C_2$ and $C_{1'}C_{2'}$ belong to anthraquinone nuclei, $C_1$ and $C_{1'}$ being in $\alpha$-position and $C_2$ and $C_{2'}$ in $\beta$-position, R stands for a pyrene radical, connected with one imino group in 3-, with the corresponding carbonyl groups in 4-, with the other imino-group in one of the positions 8 and 10 and with the other carbonyl group in 9-position.

The products obtainable by the invention are valuable in some cases as intermediate products and in most cases as dyestuffs; those of the products useful as dyestuffs may be used for example for dyeing and printing vegetable fibres such as cotton. They yield dyeings and prints which are fast.

The process of the present application is in close analogy with the process of the co-pending application Serial No. 169,915 filed October 19, 1937. While the said application is chiefly concerned with mono-acridones, the present invention leads to diacridones of the same type. Insofar as the following examples may fail to disclose every possible variation included in the present invention, full information in this respect may be obtained from the said prior application.

The following examples illustrate the invention, the parts being by weight unless otherwise stated and the relationship between parts by weight and parts by volume being that which exists between the kilo and the litre:

*Example 1*

A mixture of 3 parts of anhydrous sodium acetate, 3 parts of calcined sodium carbonate and 100 parts of nitrobenzene is boiled until 12 parts of nitrobenzene have been distilled. After cooling to 190–200° C. (oil bath temperature) 3.6 parts of 3:8-dibromopyrene (obtainable by dibrominating pyrene in carbon tetrachloride as described in Berichte vol. 70, page 930) are added together with 6.5 parts of 1-aminoanthraquinone-2-carboxylic acid ethyl ester and 0.3 part of cuprous chloride, and the whole is stirred at the above temperature for 20 hours. After cooling the mass is filtered and the solid matter is washed and extracted with boiling dilute hydrochloric acid to remove copper compounds. There is obtained in good yield a violet-black product soluble in concentrated sulfuric acid to a red-violet solution and melting above 300° C.; by boiling it for 2 hours with dilute alcoholic potash it is saponified, whereby a dark powder is produced. This latter is mixed with 84 parts of nitrobenzene and 12 parts of benzoyl chloride, the mixture being at first stirred for ½ hour at 110–120° C. and then kept at the boil for one hour. After cooling to 90° C. the solid matter is filtered and washed with benzene and alcohol. It is an olive brown powder soluble in concentrated sulfuric acid to an olive-brown solution, melting above 460° C. and dyeing cotton in a red-brown vat somewhat yellowish-brown olive tints of very good properties of fastness. It corresponds with the formula

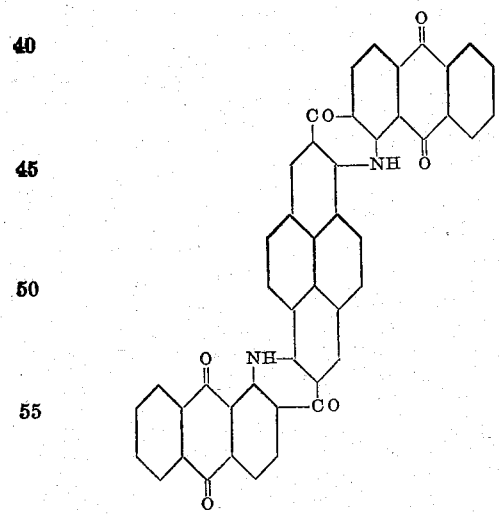

If instead of 3:8-dibromopyrene a mixture of 3:8- and 3:10-dibromopyrenes is used, the dyestuff obtained also dyes cotton olive tints.

*Example 2*

2.4 parts of 3:10-dibromopyrene (obtainable by dibrominating pyrene in carbon tetrachloride as described in Berichte, vol. 70, page 930), 4.15 parts of 1-aminoanthraquinone-2-carboxylic acid ethyl ester, 0.2 part of cuprous chloride, 1.3 parts of calcined sodium carbonate and 1 part of anhydrous sodium acetate are together boiled with 48 parts of anhydrous nitrobenzene for 12 hours while stirring. After cooling the mass is filtered, the solid matter washed and extracted with boiling dilute hydrochloric acid for removing copper compounds. There are obtained in good yield black-brown crystals, soluble in concentrated sulfuric acid to a red-brown-violet solution and melting above 300° C. This product is dissolved in concentrated sulfuric acid, reprecipitated by adding ice, filtered by suction, washed until neutral and saponified by boiling for 2 hours with alcoholic potash containing some pyridine, whereby a dark powder is produced. The latter is at first stirred for ½ hour at 110–120° C. with 20 parts of nitrobenzene and 2.2 parts of benzoyl chloride, and the mixture is finally boiled for one hour. After cooling to 90° C. the solid matter is filtered and washed with benzene and alcohol. It is a dark powder soluble in concentrated sulfuric acid to a green-yellow solution, melting above 460° C. and dyeing cotton in a red-brown vat pure yellowish olive tints of good fastness. It corresponds with the formula

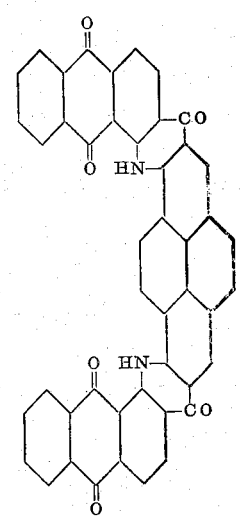

What I claim is:
1. Process for the manufacture of condensation products containing nitrogen comprising causing benzoyl chloride to react with products of the general formula

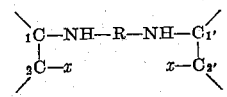

wherein the two pairs of carbon atoms $C_1C_2$ and $C_{1'}C_{2'}$ belong to anthraquinone nuclei, $C_1$ and $C_{1'}$ being in α-position and $C_2$ and $C_{2'}$ in β-position, R stands for a pyrene radical, connected with one imino group in 3-position and with the other imino group in one of the positions 8 and 10 and wherein further each $x$ is a substituent selected from the group consisting of —COOH, —COOalk, —CONH₂ and —COhal.

2. Process for the manufacture of condensation products containing nitrogen comprising causing benzoyl chloride to react with products of the general formula

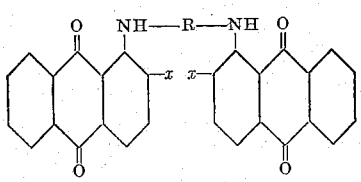

wherein R stands for a pyrene radical connected with one imino group in 3-position and with the other imino group in one of the positions 8 and 10, and wherein further each $x$ is a substituent selected from the group consisting of —COOH, —COOalk, —CONH₂ and —COhal.

3. Process for the manufacture of condensation products containing nitrogen comprising causing benzoyl chloride to react with products of the general formula

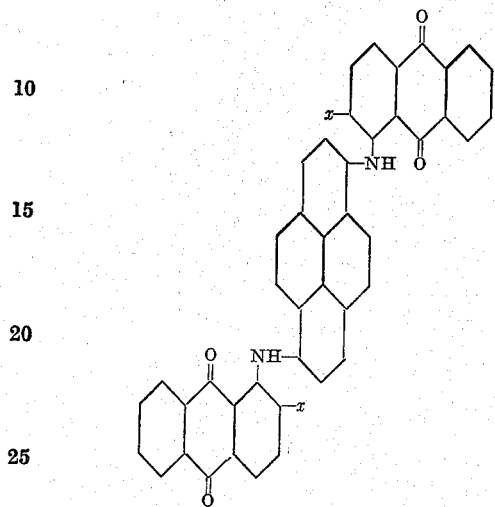

wherein each $x$ is a substituent selected from the group consisting of —COOH, —COOalk, —CONH₂ and —COhal.

4. Process for the manufacture of condensation products containing nitrogen comprising causing benzoyl chloride to react with products of the general formula

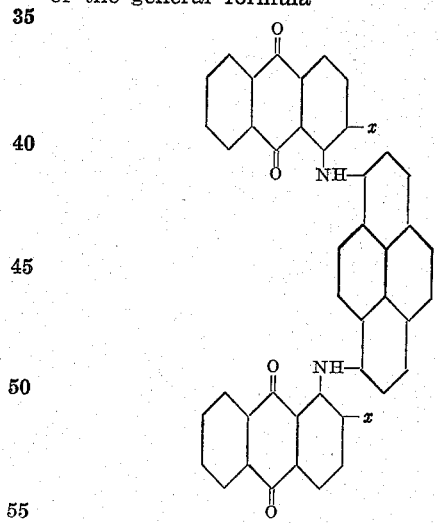

wherein each $x$ is a substituent selected from the group consisting of —COOH, COOalk, —CONH₂ and —COhal.

5. Condensation products containing nitrogen of the general formula

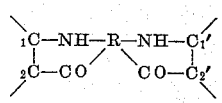

wherein the two pairs of carbon atoms $C_1C_2$ and $C_{1'}C_{2'}$ belong to anthraquinone nuclei, $C_1$ and $C_{1'}$ being in α-position and $C_2$ and $C_{2'}$ in β-position, R stands for a pyrene radical, connected with one imino group in 3-, with the corresponding carbonyl group in 4-, with the other imino group in one of the positions 8 and 10 and with the other carbonyl group in 9-position.

6. Condensation products containing nitrogen of the general formula

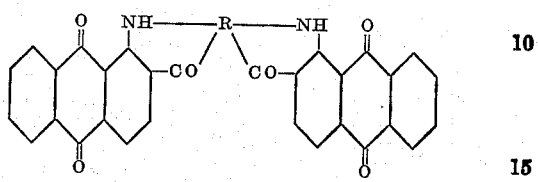

wherein R stands for a pyrene radical connected with one imino group in 3- and with the corresponding carbonyl group in 4-, with the other imino group in one of the positions 8 and 10, and with the other carbonyl group in 9-position.

7. The product of the formula

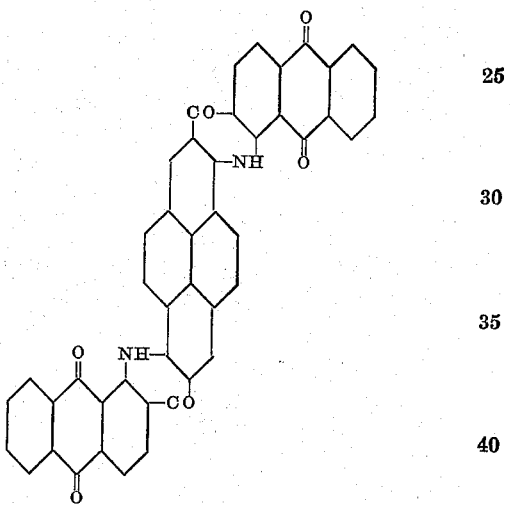

8. The product of the formula

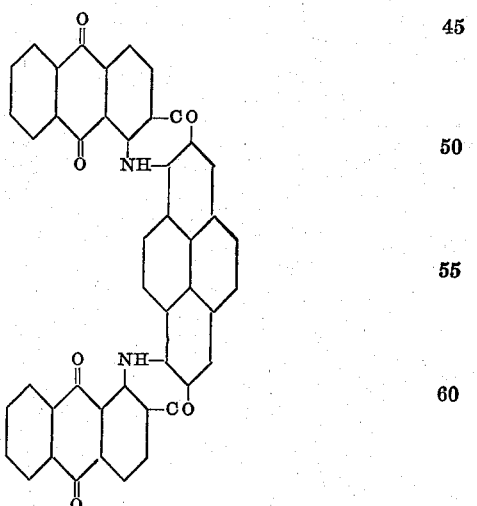

WALTER KERN.